July 31, 1934.  W. KELSO  1,968,689
COUPLER OPERATING MECHANISM
Filed Jan. 23, 1931  2 Sheets-Sheet 1
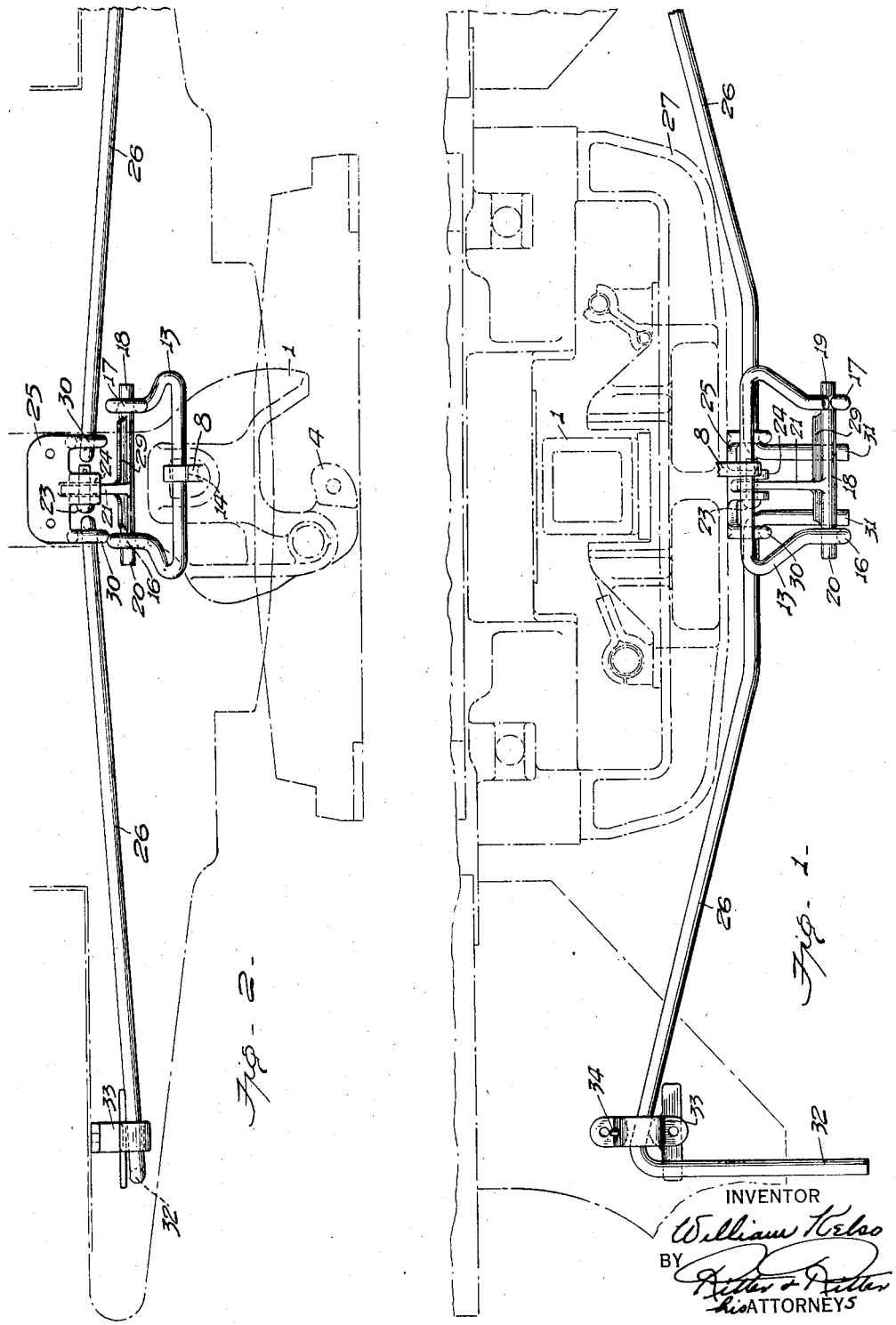
INVENTOR
William Kelso
BY
Ritter & Ritter
his ATTORNEYS July 31, 1934.  W. KELSO  1,968,689
COUPLER OPERATING MECHANISM
Filed Jan. 23, 1931    2 Sheets-Sheet 2
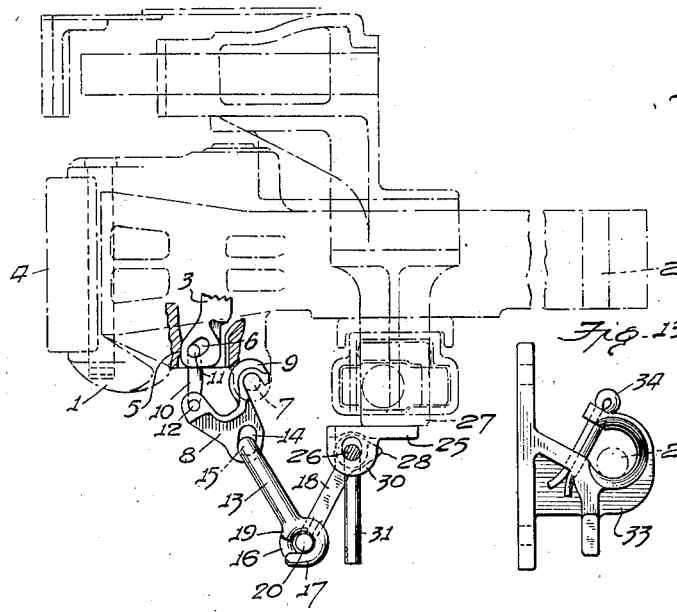
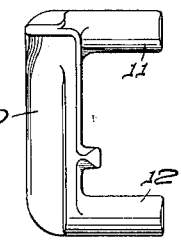
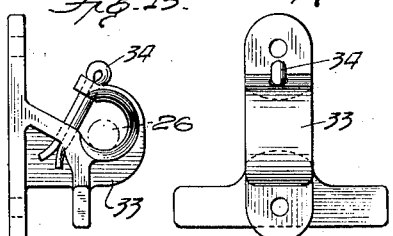
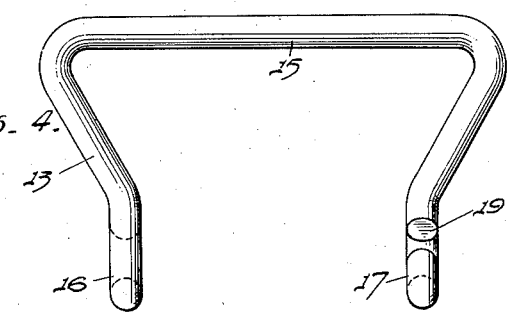
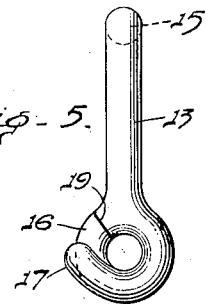
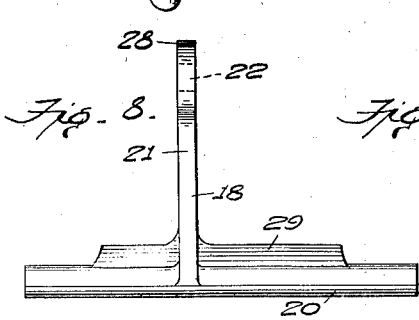
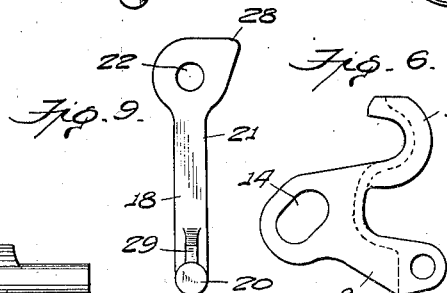
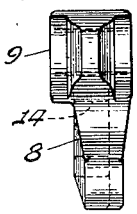
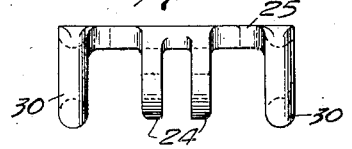
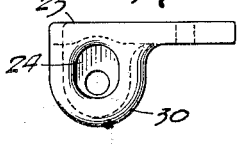
INVENTOR
William Kelso
BY
his ATTORNEYS Patented July 31, 1934

1,968,689

UNITED STATES PATENT OFFICE 1,968,689

COUPLER OPERATING MECHANISM

William Kelso, Pittsburgh, Pa., assignor to The McConway & Torley Company, Pittsburgh, Pa., a corporation of Pennsylvania Application January 23, 1931, Serial No. 510,804

9 Claims. (Cl. 213—166)

My invention relates to coupler operating mechanism for actuating the lock of a car coupler to cause it to assume unlocked position and is particularly concerned with the production of effective and reliable means positioned beneath the coupler for releasing the coupler lock. Mechanism embodying the invention is particularly well suited for application to passenger cars as it does not interfere with steam, air brake and air signal pipes as used in passenger service when the coupler swings laterally while the car is riding around a sharp curve or a short crossover.

The principal feature of the invention involves a car coupler provided with a lock for the knuckle thereof and having an opening through the bottom wall of its head affording access to the lock, with which is associated a rotatable member pivotally supported on the underside of the coupler head, the rotatable member being vertically movable and extending forwardly from its point of pivotal support and being operatively connected to the lock by a link extending upwardly from the rotatable member, the said rotatable member also being movably connected in advance of its pivot to link means extending downwardly therefrom, and said link means being movably connected to and being adapted to be actuated by a vertically swinging member.

A further feature of the invention consists in combining a car coupler having an opening in the under side of its head affording access to its lock, a rotatable member pivotally supported by and movable with the coupler, said rotatable member being formed with an aperture and being positioned beneath the coupler head, means for operatively connecting the rotatable member to the coupler lock, a link device movable with respect to the rotatable member and formed as a loop open on one side and having a portion extending through the aperture of the rotatable member, means removably connected to the link device for closing the open side of the loop, a support carried by the car to which the means for closing said loop is movably connected, and a rotatable uncoupling lever for actuating the last-named means.

Other features of the invention pertaining to advantageous relations and forms of parts will hereinafter appear and be pointed out in the claims.

In the drawings, illustrating a preferred embodiment of the invention:

Figure 1 is a front elevational view of the mechanism embodying the invention, a portion of the end of a car to which it is applied being shown in dot and dash lines.

Figure 2 is a plan view of the mechanism illustrated in Figure 1, the coupler and end of the car being shown in dot and dash lines.

Figure 3 is a side elevational view of the mechanism, portions of the coupler and the end of the car being shown in dot and dash lines.

Figure 4 is a detail view of the loop member preferably employed for actuating the member rotatably mounted on the coupler head.

Figure 5 is a detail side elevational view of the loop member.

Figure 6 is a detail side elevational view of the rotatable member mounted on the coupler head.

Figure 7 is a detail elevational view of the rotatable member, the view being at right angles to that of Figure 6.

Figure 8 is a detail view of the hanger which is movably connected to the lower end of the loop member.

Figure 9 is a detail view of the hanger, the view being taken at right angles to that of Figure 8.

Figure 10 is a detail elevational view of one of the link members of the mechanism.

Figures 11 and 12 are detail views of the bracket for supporting the hanger and the uncoupling levers.

Figures 13 and 14 are detail views of the bracket forming a support for the outer end of the uncoupling lever.

In the drawings, 1 indicates a car coupler which is designed to be mounted upon the car so as to be capable of swinging laterally with respect thereto as is commonly the case with couplers employed in passenger service. As shown in the drawings, the shank of the coupler may be provided at its rear end with a pivot pin opening 2 for receiving a tail pin forming a pivotal connection for the coupler in a well-known manner. The coupler illustrated in the drawings is of the well-known E-type and, therefore, will not be specifically described.

Its vertically movable and rearwardly swinging lock 3 by which outward rotation of the knuckle 4 is restrained projects when in locked position into an opening 5 through the bottom wall of the coupler head, the lower end of the lock being fashioned with a transversely extending inclined slot 6.

To the rear of the lock opening 5 the coupler head is provided on its under side with a pivot 7 forming a support for the vertically rotatable member or rotor 8, the pivotal connection between the coupler and the rotor being preferably effected by providing the latter with a portion 9 which hooks around the pivot 7 of the coupler head. The rotor extends forwardly from its point of pivotal support 7 and at its outer end at a point which is below its axis of rotation when the lock 3 is in locked position, it is pivotally connected to a link 10 whose upper end is slidably and pivotally attached to the lock. As shown in Figure 10 this link may advantageously be like that employed in the E-coupler, being provided at its ends with laterally projecting trunnions 11 and 12 which respectively project into the openings of the coupler lock and the rotor 8. As both trunnions 11 and 12 are on the same side of the link 10 the latter may be associated with the lock and with the rotor by lowering the lock 3 in the coupler head during the assembly of the parts.

Movably connected to and extending downwardly from the rotatable member 8 is a link device 13 which executes a vertical swinging movement when the mechanism is actuated to cause an unlocking movement of the coupler lock. The link device 13 and the rotor 8 are preferably movably attached by a pin and slot connection, the slot 14 being in the rotor and being spaced from the point of pivotal support of the latter and from the point of its pivotal connection to the link member 10.

The link device 13 may advantageously be in the form of a loop which is open on one side, its transversely disposed portion 15 extending through the aperture 14 of the vertically rotatable member 8. The transversely extending portion 15 of the loop is of sufficient length to permit the member 8 to shift its position laterally with respect thereto for a distance corresponding to the sidewise swinging movements of the coupler. The sides of the loop member, which preferably converge toward each other downwardly, are provided with eyes, 16 and 17 respectively, for receiving a vertically swinging hanger 18 serving to close the open side of the loop, the eye 17 being slotted or open on its forward side, as indicated at 19 to permit the hanger to be assembled with the loop member. The hanger 18 which is movably connected to the lower end of the link device 13 is preferably provided with a transversely extending journal or bar portion 20 integrally united to which is a rearwardly extending arm 21. This arm is formed with an opening 22 for receiving a pivot pin 23 which passes through suitable apertures in spaced lugs 24 forming a part of a bracket 25 constituting means for supporting the hanger 18 as well as the rotatable uncoupling levers 26 extending to the sides of the car. As shown in the drawings the supporting bracket 25 may conveniently be mounted upon the under side of the coupler carrier 27. At its upper end the vertically extending portion 21 of the hanger is preferably provided with a rearwardly projecting lug or extension 28 which prevents the hanger 18 from being assembled in an incorrect position, because if the hanger is assembled with the bracket 25 so that the lug 28 is toward the front the latter, by engaging with the overlying plate portion of the bracket, prevents the lower end of the hanger from swinging forwardly far enough to be connected with the link device 13 when the latter is assembled with the other parts of the mechanism.

Intermediate of its ends the shaft or transversely extending portion 20 of the hanger has cast integral therewith a rib or lug 29 of somewhat less length than the shaft and of a form at one end permitting it to pass through the slot or opening 19 in the forward side of the eye 17 of the loop member. The rib 29 is preferably only enough shorter than the distance between the eyes of the loop member to provide a reasonable working clearance between the parts.

In addition to the pivot lugs 24 for receiving the pin 23 by which the hanger 18 is movably supported at its rear end, the bracket 25 is preferably provided with perforated lugs 30 forming bearings for supporting the inner ends of the transversely extending rotatable uncoupling levers 26, the lugs 30 being spaced laterally from the lugs 24 so as to provide space for the introduction and operation of the downwardly extending inner end portions 31 of the rotatable uncoupling levers 26. The openings in the lugs 24 and 30 of the bracket are preferably positioned so that when the uncoupling levers 26 are in place the pivot pin 23 by which the hanger 18 is connected to the bracket cannot accidentally escape from assembled position, although this pin may additionally be safeguarded against loss by extending a cotter therethrough if desired.

Each of the uncoupling rods or rotatable levers 26 is journalled at its outer end adjacent its handle 32 in a bracket 33 rigidly secured to the car body. These brackets 33 may be of any suitable form, but preferably are of the well-known form illustrated permitting the uncoupling lever to be assembled therewith by removing and replacing the cotter 34.

In assembling the mechanism the rotatable member 8 is positioned on the pivot pin 7 of the coupler head. This rotatable member and the loop member 13 are then brought into operative relation by threading the open eye-shaped end 17 of the loop through the elongated opening 14 in the intermediate portion of the member 8. By then holding the hanger member 18 in such position that the rib 29 cast integral with the shank section thereof will longitudinally pass through the opening or slot 19 in the eye 17 of the loop, the longer end of the shaft 20 of the hanger may be slid through the eye 17 until the outer end of the short shank section is inside of the closed eye 16 of the loop. The hanger 18 is then shifted transversely of the loop member in the opposite direction until the short section of the shaft 20 is introduced into the eye 16. The hanger 18 is then rotated to assume assembled relation to the loop 13, thus bringing the rib 29 out of alinement with the slot 19 of the eye 17 and thereby preventing any such relative lateral shifting of the hanger and loop as would permit them to become accidentally disassociated. When the parts have thus been assembled the perforated upper end of the hanger 18 is placed between the centrally located pivot lugs 24 of the supporting bracket 25 carried by the car and the pivot pin 23 is then inserted by passing it through one of the openings in the lugs 30 by which the uncoupling levers 26 are supported at their inner ends. With these parts in working position the link or toggle member 10 is put in place thus connecting the forward end of the rotor member 8 with the lower end of the coupler lock 3. The assembly of the link 10 with the member 8 and lock 3 is effected in the usual manner by lowering the lock 3 in the coupler head until the slot 6 in the lower end of the lock is sufficiently below the head of the coupler to permit the pivot pin or trunnion 11 of the link 10 to be inserted therein while the trunnion 12 at the lower end of the link is being introduced into the opening therefor in the rotatable member 8. The downwardly extending inner ends 31 of the uncoupling levers 26 are then inserted through the openings in the corresponding lugs 30 of the supporting bracket 25 after which the outer ends of said uncoupling levers are introduced into the brackets 33 at the sides of the car and the cotter pins 34 are inserted to prevent the levers from escaping. As thus assembled the parts are interlocked against accidental disassociation.

The coupler lock 3 may be caused to execute an unlocking movement by operating either of the rotatable uncoupling levers 26. When either of those levers is operated its downwardly extending inner end 31 swings vertically upward until it comes into contact with the transversely extending shaft 20 of the vertically movable hanger 18. Continued uncoupling rotation of the lever 26 causes the link device or loop member 13 to impart an upward rotation to the rotor 8 pivotally mounted on the underside of the coupler head, thereby causing the link 10 to actuate the lock 3.

I claim:

1. In mechanism of the character indicated, the combination with a car coupler provided with a lock for the knuckle thereof and having an opening in the under side of its head affording access to said lock, of a rotatable member pivotally supported by and movable with said coupler, said rotatable member being positioned beneath the coupler head and extending forwardly from its point of pivotal support and being vertically movable, a plurality of links each movably connected to said rotatable member, one of said links extending upwardly from the rotatable member and being movably connected to the lock and one of said links extending downwardly from the rotatable member, and means for actuating said downwardly extending link to effect an uncoupling rotation of said rotatable member, one of said links being connected to said rotatable member by a pin and slot connection, and said downwardly extending link being so constructed and arranged as to permit said coupler and said rotatable member to move laterally with respect thereto.

2. In mechanism of the character indicated, the combination with a car coupler provided with a lock for the knuckle thereof and having an opening in the under side of its head affording access to said lock, of a rotatable member pivotally supported by and movable with the coupler, said rotatable member being positioned beneath the coupler head and extending forwardly from its center of rotation, a link movably connected to said rotatable member and movably connected to the lock, said rotatable member being provided with an aperture in spaced relation to its center of rotation, a link device depending from and movable with respect to the rotatable member and having a portion extending transversely through said aperture, and means for actuating said depending link device to cause an uncoupling rotation of said rotatable member, said rotatable member and said depending link being so constructed and arranged as to permit said coupler to move laterally with respect to said depending link.

3. In mechanism of the character indicated, the combination with a car coupler provided with a lock for the knuckle thereof and having an opening in the under side of its head affording access to said lock, of a rotatable member pivotally supported by and movable with the coupler, said rotatable member being provided with an aperture and being positioned beneath the coupler head and extending forwardly from its center of rotation, means for operatively connecting said rotatable member to the lock, a link device extending downwardly from and movable with respect to the rotatable member, said link device being formed as a loop open on one side and having a portion extending through said aperture, rigid means consisting of a transversely extending bar engaging and removably connected to said link device for closing the open side of said loop, a support to which said last-named means is movably connected, and an uncoupling lever for actuating said last-named means.

4. In mechanism of the character indicated, the combination with a car coupler provided with a lock for the knuckle thereof and having an opening in the under side of its head affording access to said lock, of a rotatable member pivotally supported by and movable with the coupler, said rotatable member being provided with an aperture in spaced relation to its pivotal point and being positioned beneath the coupler head and extending forwardly from its center of rotation, a member movable with respect to and operatively connecting said rotatable member and the lock, a link device movable with respect to the rotatable member and formed as a loop open on one side, said loop having a portion extending through said aperture and being provided with a plurality of eyes one of which is slotted, a movable hanger having a portion journalled in said eyes and provided with means adapted to pass through the slot of said slotted eye for engaging said loop to prevent accidental disassociation of said hanger therefrom, means for movably supporting said hanger, and means for causing said hanger to execute an uncoupling movement.

5. In mechanism of the character indicated, the combination with a car coupler provided with a lock for the knuckle thereof and having an opening in the under side of its head affording access to said lock, of a rotatable member pivotally supported by and movable with the coupler, said rotatable member being positioned beneath the coupler head and extending forwardly from its center of rotation and being provided with an aperture in spaced relation to its pivotal point, a member movably connected to the lock and to said rotatable member, a link device movably connected to said rotatable member, said link device being formed as a loop open on one side and having a portion extending through said aperture, a hanger having a transversely extending portion journalled on said link device and serving to close the open side of said loop, means for movably supporting said hanger, and a rotatable uncoupling lever movable into engagement with the transversely extending portion of said hanger to effect an uncoupling movement of the latter.

6. In mechanism of the character indicated, the combination with a car coupler provided with a lock for the knuckle thereof and having an opening in the under side of its head affording access to said lock, of a rotatable member pivotally supported by and movable with the coupler, said rotatable member being provided with an elongated aperture in spaced relation to its pivotal point and being positioned beneath the coupler head and extending forwardly from its center of rotation, a link pivotally connected to the rotatable member and extending upwardly therefrom and having a pin and slot connection with said lock, a link device movable with respect to the rotatable member and formed as a loop open on one side, said loop having a portion extending through said aperture, a vertically swinging hanger having a portion journalled in said device and closing the open side of said loop and having a portion extending rearwardly therefrom, means connected to said rearwardly extending portion for rotatably supporting said hanger, and a rotatable uncoupling lever having a portion adapted to engage said hanger to cause the latter to execute an uncoupling movement.

7. In mechanism of the character indicated, the combination with a car coupler provided with a lock for the knuckle thereof and having an opening in the underside of its head affording access to said lock, of a rotatable member pivotally supported by and movable with the coupler, said rotatable member being positioned beneath the coupler head and extending forwardly from its center of rotation, a link movably connected to the rotatable member and movably connected to said lock, a link device movably connected to said rotatable member and extending downwardly therefrom when said lock is in locked position, a vertically swinging hanger movably connected to said link device and having a portion provided with a pivot pin opening, a bracket provided with a plurality of perforated lugs for receiving said hanger between them, a pivot pin extending through said hanger and lugs, and rotatable uncoupling levers provided at their inner ends with downwardly extending portions adapted to engage and actuate said hanger, said bracket being provided with spaced lugs for rotatably supporting said uncoupling levers, one of said uncoupling levers when in assembled position serving to retain said pivot pin in place.

8. In mechanism of the character indicated, the combination with a car coupler provided with a lock for the knuckle thereof and having an opening in the underside of its head affording access to said lock, of a rotatable member pivotally supported by and movable with the coupler, said rotatable member being positioned beneath the coupler head and extending forwardly from its point of pivotal support and being vertically movable, a link movably connected to said rotatable member at a point in advance of the pivotal point of the latter, said link being operatively connected to the coupler lock and being supported by the latter, a member extending downwardly from said rotatable member and having a pin and slot connection with said rotatable member, said pin and slot connection being below the point of rotation of said rotatable member and permitting said coupler to move laterally with respect to said downwardly extending member, means for actuating said downwardly extending member to effect an uncoupling rotation of said rotatable member, and a bracket rigidly mounted on the car body and to which said means are pivotally connected.

9. In mechanism of the character indicated, the combination with a car coupler provided with a lock for the knuckle thereof and having an opening in the underside of its head affording access to said lock, of a vertically rotatable member supported by and movable with the coupler, said rotatable member being positioned beneath the coupler head and extending forwardly from its center of rotation, a link movably connected to said rotatable member at a point in advance of the center of rotation of the latter, said link being movably connected to the coupler lock, a vertically movable member extending downwardly from said rotatable member and movably connected to said rotatable member below the point of rotation of the latter, a bracket rigidly secured to the car body, and means pivotally supported by said bracket for actuating said vertically movable member to effect an uncoupling rotation of said rotatable member, the adjacent ends of said link and said vertically movable member being maintained in spaced relation by said rotatable member, and said downwardly extending member and said vertically rotatable member being so constructed and arranged as to permit lateral movement of said coupler with respect to said bracket.

WILLIAM KELSO.